Jan. 8, 1924.

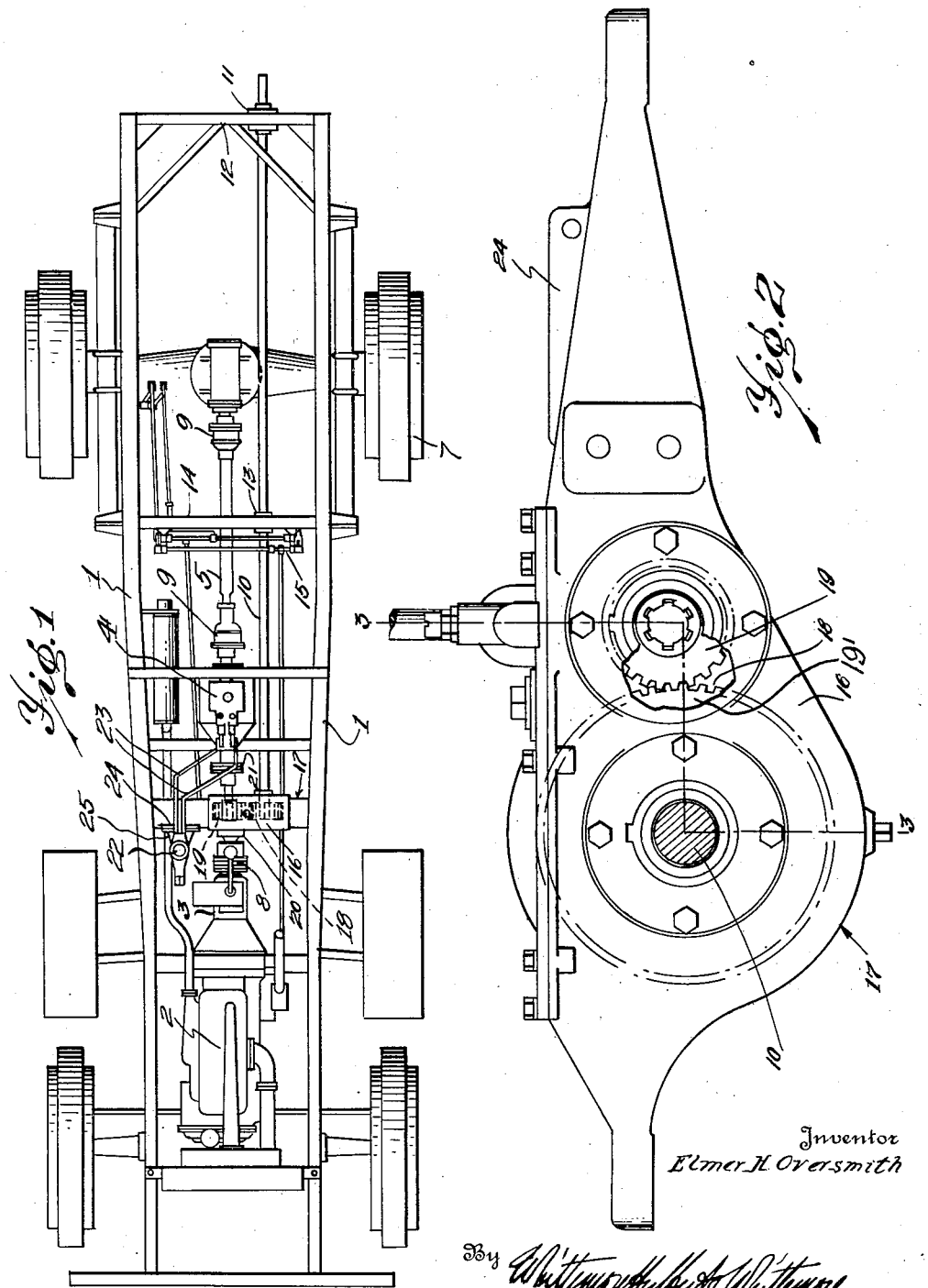

E. H. OVERSMITH

TRUCK

Filed May 21, 1920       2 Sheets-Sheet 2

1,480,296

Inventor
Elmer H. Oversmith

Patented Jan. 8, 1924.

1,480,296

UNITED STATES PATENT OFFICE.

ELMER H. OVERSMITH, OF BUFFALO, NEW YORK, ASSIGNOR TO THE BUFFALO TRUCK & TRACTOR CORPORATION, OF BUFFALO, NEW YORK, A CORPORATION OF NEW YORK.

TRUCK.

Application filed May 21, 1920. Serial No. 383,050.

*To all whom it may concern:*

Be it known that I, ELMER H. OVERSMITH, a citizen of the United States of America, residing at Buffalo, in the county of Erie and State of New York, have invented certain new and useful Improvements in Trucks, of which the following is a specification, reference being had therein to the accompanying drawings.

The invention relates to motor vehicles and more particularly to trucks. The invention has for one of its objects to provide a construction embodying an auxiliary transmission gearing between the transmission gearing and drive axle, and a power transmission gearing between the two transmission gearings, these gearings being operatively connected to each other by universal joints. Another object is the provision of a simple form of combined mounting and housing for the power transmission gearing. Further objects of the invention reside in the novel arrangements and combinations of parts as more fully hereinafter set forth.

In the drawings:

Figure 1 is a top plan view of the construction embodying my invention;

Figure 2 is a side elevation partly in section of the power transmision gearing;

Figure 3:
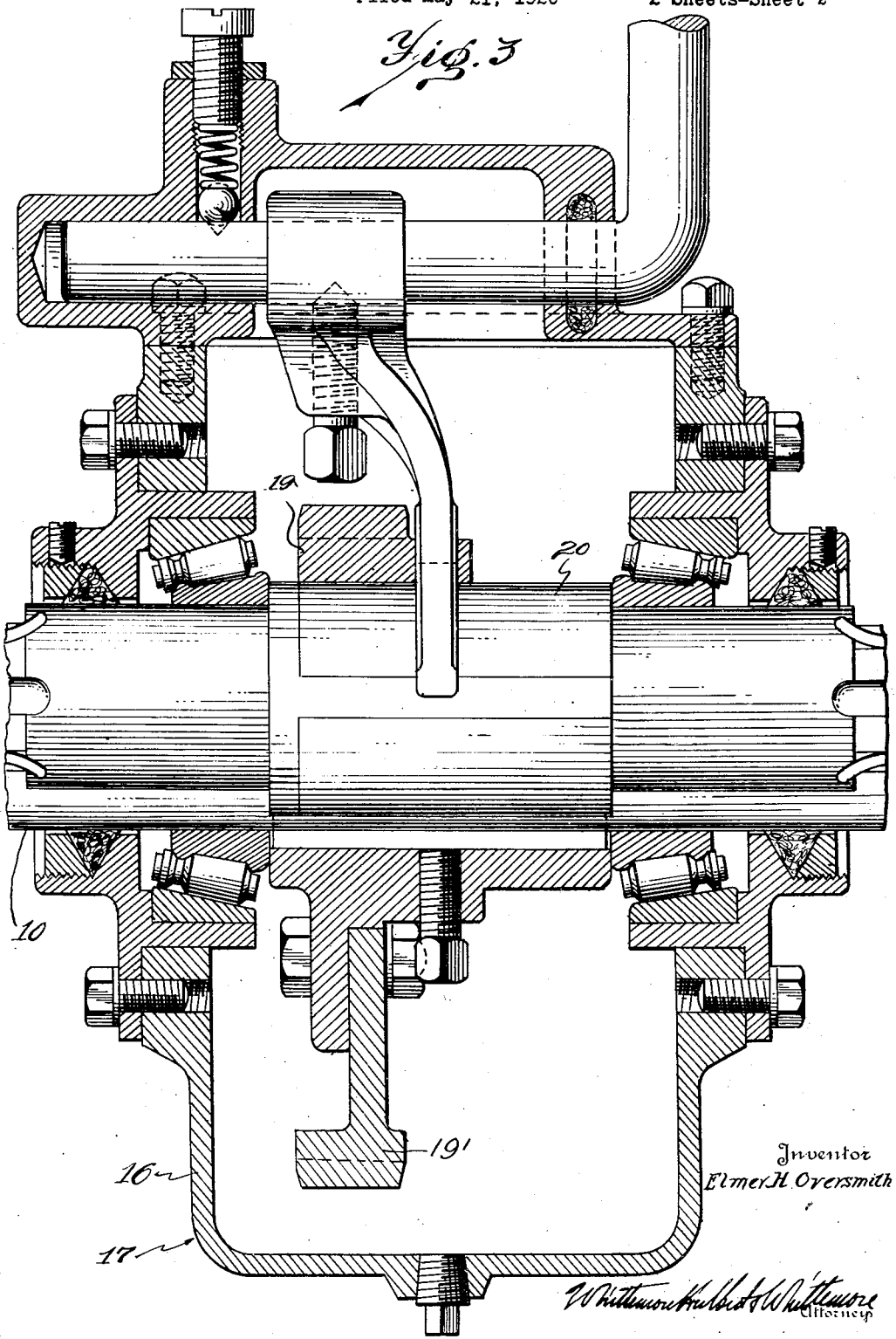
Figure 3 is a cross section on the line 3—3 of Figure 2.

1 are the side sills of the truck frame, 2 is the engine, 3 the usual transmission gearing mounted in a housing rigidly secured to the engine housing and adapted to be operatively connected to the engine flywheel (not shown), 4 is an auxiliary transmission gearing between the transmission gearing 3 and the drive shaft 5 which latter is operatively connected to the drive wheels 7 of the truck. The engine 2 with the transmission gearing 3 and the auxiliary transmission gearing 4 are units mounted upon the side sills 1, and for the purpose of permitting of relative movement of the auxiliary transmission gearing 4 and the transmission gearing 3, a suitable universal joint 8 is provided therebetween. The usual pair of universal points 9 are also provided in the drive shaft 5.

The above arrangement is such that the range of gear ratios is greatly increased so that the speed of the truck relative to the speed of rotation of the engine is greatly varied.

For the purpose of providing a simple power transmission take-off for performing work through the engine other than driving the truck, there is provided the power shaft 10 which extends longitudinally of the truck frame and is preferably anti-frictionally mounted near its rear end in the bracket 11 depending from the rear cross bar 12 of the frame and intermediate its ends in the bracket 13 depending from the cross bar 14 intermediate the ends of the side sills 1, which cross bar also carries the evener connections 15 for the brake operating mechanism. The forward end of the power shaft 10 is journaled in the support 17 for the power transmission gearing 18, which support extends between the side sills 1 of the truck frame. The support has the enlargement 16 which incloses the power transmission gearing 18 comprising the driving gear 19 splined upon the driving shaft 20 and the gear 19' keyed upon the power shaft 10. The driving shaft 20 is in substantial alignment with and is operatively connected to the driving shafts extending from and to the transmission gearing 3 and auxiliary transmission gearing 4 respectively. The gear 19 is slidably mounted upon the shaft 20 to be engaged with or disengaged from the gear 19' for operatively connecting or disconnecting the power shaft 10 and the shaft 20. The arrangement is such that the power transmission gearing is supported upon the truck frame independent of the transmission gearing 3 and auxiliary transmission gearing 4 and to permit of independent movement of the power transmission gearing and also auxiliary transmission gearing there is a universal joint 21 in the driving connection therebetween.

The support 17 for the power transmission gearing also supports the shifting lever 22 which is operatively connected to the rods 23 for shifting the gears of the auxiliary transmission gearing 4. In detail the support 17 has the vertically extending flange 24 at its forward side to which the bearing bracket 25 may be suitably secured as by bolts, which bearing bracket supports the shifting lever 22.

From the above description it will be readily seen that the usual transmission gearing 3, auxiliary transmission gearing 4 and power transmission gearing 18 are separate units independently mounted upon the truck frame and operatively connected to each other by universal joints to permit of independent movement thereof. Also the power shaft 10 can be driven independent of the auxiliary transmission gearing and at the selected speed of rotation which is governed by the relative positions of the gears in the transmission gearing 3. A further important consideration is that the support for the power transmission gearing extends between the side sills of the truck frame and assist in reinforcing the same. Also this support acts as a support for the shifting lever for the gears of the auxiliary transmission gearing. Also the cross bar intermediate the ends of the side sills performs the function of supporting the power shaft and the function of supporting the evener connections for the brake mechanism.

What I claim as my invention is:

1. In a motor vehicle, the combination with the engine and the transmission gearing connected thereto, of a drive shaft, an auxiliary transmission gearing between said drive shaft and first mentioned transmission gearing and supported independently of said first-mentioned transmission gearing, a power transmission gearing intermediate said first-mentioned transmission gearing and auxiliary transmission gearing and mounted independently thereof, and means for selectively driving either said power transmission gearing or auxiliary transmission gearing from said first-mentioned transmission gearing independently of each other.

2. In a motor vehicle, the combination with the engine and the transmission gearing connected thereto, of a drive shaft, an auxiliary transmission gearing between said drive shaft and first-mentioned transmission gearing, a power transmission gearing between said first-mentioned transmission gearing and auxiliary transmission gearing and provided with a shaft operatively connected to both of said gearings, each of said gearings being mounted independently of the others, and universal driving connections between said shaft and first-mentioned transmission gearing and auxiliary transmission gearing.

3. In a motor vehicle, the combination with a frame, of an engine and a transmission gearing operatively connected thereto, an auxiliary transmission gearing adapted to be operatively connected to said first-mentioned transmission gearing, a power shaft having bearings in cross bars of said frame, a power transmission gearing connected to said power shaft and adapted to be operatively connected to said first-mentioned transmission gearing independent of said auxiliary transmission gearing, said gearings being mounted upon said frame independently of each other, and universal driving connections between said first mentioned transmission gearing and power transmission gearing and said power transmission gearing and auxiliary transmission gearing.

4. In a motor vehicle, the combination with an engine and a transmission gearing adapted to be operatively connected thereto, of an auxiliary transmission gearing, a power transmission gearing adapted to be operatively connected to said first-mentioned transmission gearing independent of said auxiliary transmission gearing, means for adjusting the relative positions of the gears of said auxiliary transmission gearing and a support independent of said first-mentioned gearing and auxiliary gearing for both said power transmission gearing and for said adjusting means.

5. In a motor vehicle, the combination with frame side sills, of a pair of transmission gearings mounted thereon, means for adjusting the relative positions of the gears of one of said transmission gearings, and a support for the other of said transmission gearings and said adjusting means, said support extending between said side sills.

6. In a motor vehicle, the combination with frame side sills, of a power transmission gearing and an auxiliary transmission gearing mounted thereon, means for adjusting the relative positions of the gears of said auxiliary transmission gearing, and a support for said power transmission gearing and said gear adjusting means, said support extending between and reinforcing said side sills.

In testimony whereof I affix my signature.

ELMER H. OVERSMITH.